(12) United States Patent
Walker

(10) Patent No.: US 7,430,503 B1
(45) Date of Patent: *Sep. 30, 2008

(54) METHOD OF COMBINING CORPORA TO ACHIEVE CONSISTENCY IN PHONETIC LABELING

(75) Inventor: Brenton D. Walker, College Park, MD (US)

(73) Assignee: The United States of America as represented by the Director, National Security Agency, Washington, DC (US)

( * ) Notice: Subject to any disclaimer, the term of this patent is extended or adjusted under 35 U.S.C. 154(b) by 794 days.

This patent is subject to a terminal disclaimer.

(21) Appl. No.: 10/928,879

(22) Filed: Aug. 24, 2004

(51) Int. Cl.
*G10L 15/06* (2006.01)
*G06F 17/20* (2006.01)

(52) U.S. Cl. .............. 704/8; 704/10; 704/277

(58) Field of Classification Search ........... 704/8, 704/9, 10, 243, 244, 255, 277
See application file for complete search history.

(56) References Cited

U.S. PATENT DOCUMENTS

| | | | |
|---|---|---|---|
| 4,979,216 A * | 12/1990 | Malsheen et al. | 704/260 |
| 5,758,023 A | 5/1998 | Bordeaux | |
| 5,815,639 A * | 9/1998 | Bennett et al. | 704/235 |
| 5,926,787 A * | 7/1999 | Bennett et al. | 704/235 |
| 5,950,159 A | 9/1999 | Knill | |
| 6,002,998 A * | 12/1999 | Martino et al. | 704/9 |
| 6,023,670 A * | 2/2000 | Martino et al. | 704/8 |
| 6,073,095 A | 6/2000 | Dharanipragada et al. | |
| 6,085,160 A * | 7/2000 | D'hoore et al. | 704/256.2 |
| 6,178,397 B1 * | 1/2001 | Fredenburg | 704/1 |
| 6,385,579 B1 | 5/2002 | Padmanabhan et al. | |
| 7,107,215 B2 * | 9/2006 | Ghali | 704/257 |
| 7,149,688 B2 * | 12/2006 | Schalkwyk | 704/255 |
| 7,191,116 B2 * | 3/2007 | Alpha | 704/8 |
| 7,277,851 B1 * | 10/2007 | Henton | 704/235 |
| 2002/0173945 A1 * | 11/2002 | Fabiani et al. | 704/1 |
| 2003/0135356 A1 | 7/2003 | Ying et al. | |
| 2005/0033575 A1 * | 2/2005 | Schneider | 704/254 |
| 2005/0165602 A1 * | 7/2005 | Cote et al. | 704/9 |
| 2005/0197837 A1 * | 9/2005 | Suontausta et al. | 704/260 |

OTHER PUBLICATIONS

Definition of "Allophone", Encyclopedia Britannica Online, One Page.*
Francoise Beaufays et al., "Learning Name Pronunciations in Automatic Speech Recognition Systems," undated.

* cited by examiner

*Primary Examiner*—Martin Lerner
(74) *Attorney, Agent, or Firm*—Robert D. Morelli

(57) ABSTRACT

The present invention is a method of combining corpora to achieve consistency in phonetic labeling. Corpora are received. A first corpus is selected from the corpora. Generating a phonetic transcript if the first corpus does not include one. A second corpus is selected from the corpora. Generating a phonetic transcript if the second corpus does not include one. Each allophone in the second corpus is identified. At least one allophone is identified for each phone in the second corpus. For each phone in the second corpus, the allophone to which it most closely matches is identified. Each phone symbol in the phone transcript of the second corpus is replaced with a symbol for the corresponding identified allophone. The first corpus and second corpus are combined, including their phonetic transcripts, and designated as the first corpus. If there is another corpus in the corpora to be processed return to the step of selecting another second corpus.

12 Claims, 1 Drawing Sheet

METHOD OF COMBINING CORPORA TO ACHIEVE CONSISTENCY IN PHONETIC LABELING

FIELD OF THE INVENTION

The present invention relates, in general, to data processing and, in particular, to speech signal processing.

BACKGROUND OF THE INVENTION

A phone is the minimum unit of sound articulated during speech. A phoneme is the minimum unit of speech that distinguishes one word from another in a particular language. A phoneme may consist of one or more phones, and variations of phones (i.e., allophones) which may be used without changing the meaning of the corresponding word. The exact number of phonemes in English depends on the speaker, but it is accepted that English contains between 40 and 45 phonemes, which is about average. At the extremes, one language contains only 10 while another contains 141.

Phonetic writing, or transcription, is the representation of the sounds of speech with a set of distinct symbols. For example, the letters used to spell the word "call" are intended to represent the meaning of the word, whereas the phonetically representation of this word (i.e., "kOl") is meant to represent how the word sounds. The primary script used for phonetic writing is the International Phonetic Alphabet.

Speech processing applications often require a database of transcribed speech (corpus) or a number of such databases (corpora). Corpora have been generated with and without phonetic information. Phonetic information is required for some speech processing applications that perform an interpretation of, or conversion to, a spoken sound.

Speech data is phonetically labeled either manually or by an automatic method commonly referred to as forced alignment. In forced alignment, each sound in a speech sample is matched with a phone that most closely matches the sound to form a phonetic transcript of the speech sample.

With the ever increasing globalization of activities, it is becoming more important for speech processing application to process more than one language. One approach to adding multi-lingual capability to speech processing applications is to combine corpora which have been tailored to a specific language. However, blindly combining corpora which have been phonetically transcribed by different methods or people often produces worse results than just using one corpus. The suspected reason for this is that inconsistencies may be introduced by a method, or person, having its own threshold for determining when a textual unit matches a phone and vice versa. Since the difference in sound between one word and a word of another meaning can be very slight, any inaccuracy in the interpretation or conversion of sound could result in something that is totally unintelligible. For example, it has been reported that voice recognition systems trained on corpora of American English speakers do a poor job of interpreting the words of British English speakers.

In an article entitled "Learning Name Pronunciations in Automatic Speech Recognition Systems, Francoise Beaufays et al. disclose a method of learning proper name pronunciation by finding the phone sequence that best matches a sample speech waveform. The method employs linguistic knowledge to determine if the resulting pronunciation is linguistically reasonable.

U.S. Pat. No. 5,758,023, entitled "MULTI-LANGUAGE SPEECH RECOGNITION SYSTEM," discloses a device for and method of transcribing speech into one of many predetermined spoken languages by identifying phones, combining the phones into phonemes, and translating the phonemes into the desired foreign language. U.S. Pat. No. 5,758,023 is hereby incorporated by reference into the specification of the present invention.

U.S. Pat. No. 5,950,159, entitled "WORD SPOTTING USING BOTH FILLER AND PHONE RECOGNITION," discloses a device for and method of word spotting by processing acoustic data to identify phones, generate temporal delimiters, generate likelihood scores, identifying sequences of phones, and using the temporal delimiters and likelihood scores to recognize keywords. U.S. Pat. No. 5,950,159 is hereby incorporated by reference into the specification of the present invention.

U.S. Pat. No. 6,073,095, entitled "FAST VOCABULARY INDEPENDENT METHOD AND APPARATUS FOR SPOTTING WORDS IN SPEECH," discloses a device for and method of spotting words by using Viterbi-beam phone level decoding with a tree-based phone language model. U.S. Pat. No. 6,073,095 is hereby incorporated by reference into the specification of the present invention.

U.S. Pat. No. 6,385,579 B1, entitled "METHODS AND APPARATUS FOR FORMING COMPOUND WORDS FOR USE IN A CONTINUOUS SPEECH RECOGNITION SYSTEM," discloses a device for and method of identifying consecutive word pairs and replacing the same with a corresponding compound word. U.S. Pat. No. 6,385,579 B1 is hereby incorporated by reference into the specification of the present invention.

U.S. Pat. Appl. No. 2003/0135356 A1, entitled "METHOD AND APPARATUS FOR DETECTING PROSODIC PHRASE BREAK IN A TEXT TO SPEECH (TTS) SYSTEM," discloses a device for and method of processing speech by receiving text, identifying parts of speech, generating a part of speech sequence, detecting prosodic phrase break using a neural network, and generating a prosodic phrase boundary based on the prosodic breaks. U.S. Pat. Appl. No. 2003/0135356 A1 is hereby incorporated by reference into the specification of the present invention.

There is a need to add multi-lingual capability to speech processing application. To do this, one may need to combine corpora containing phonetic information that were generated by different methods or produced by different people having different standards for phonetic transcription. Therefore, there is a need to combine corpora of different types in a manner that minimizes any inconsistency in how phonetic information is generated for each type of corpus.

SUMMARY OF THE INVENTION

It is an object of the present invention to combine corpora so that phonetic information associated with any combined corpus is generated in a manner that is consistent with how such information is generated for any other corpus in the combination.

It is another object of the present invention to combine corpora of different languages so that phonetic information associated with any combined corpus is generated in a manner that is consistent with how such information is generated for any other corpus in the combination.

The present invention is a method of combining corpora to achieve consistency in phonetic labeling.

The first step of the method is receiving corpora.

The second step of the method is selecting a first corpus from the corpora.

If the first corpus does not include a phonetic transcript then the third step of the method is generating the phonetic transcript using a user-definable pronunciation dictionary.

The fourth step of the method is selecting a second corpus from the corpora.

If the second corpus does not include a phonetic transcript then the fifth step of the method is generating the phonetic transcript using a user-definable second pronunciation dictionary.

The sixth step of the method is identifying at least one allophone for each phone in the second corpus.

The seventh step of the method is identifying for each phone in the second corpus one of the at least one allophone in the last step that most closely matches the phone in the second corpus, using a user-definable acoustic model for each of the at least one allophone.

The eighth step of the method is replacing each phone symbol in the phonetic transcript of the second corpus with a symbol for the corresponding allophone identified in the last step.

The ninth step of the method is combining the first corpus and the second corpu, including the phonetic transcript of the first corpus and the phonetic transcript of the second corpus, and designating the result as the first corpus.

The tenth, and last, step of the method is returning to the fourth step if there is another corpus to be processed, otherwise stopping.

DETAILED DESCRIPTION

Figure 1:
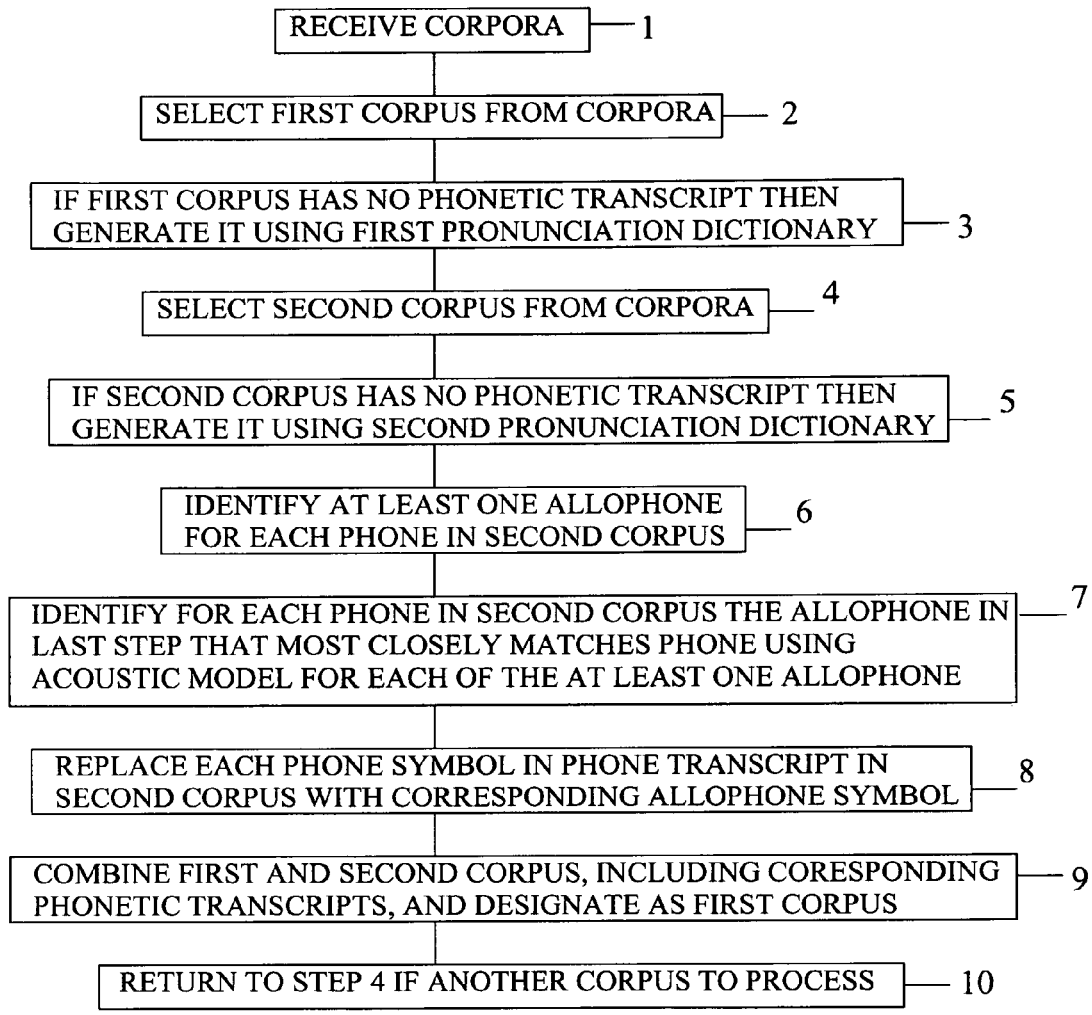
FIG. 1 is a list of the steps of the present invention.

The present invention is a method of combining corpora to achieve consistency in phonetic labeling.

FIG. 1 is a list of steps of the present method.

The first step 1 of the method is receiving corpora. In the preferred embodiment, different languages are represented by the corpora. However, the present invention is not limited to having only one corpus per language. More than one corpus may be in the same language.

The second step 2 of the method is selecting a first corpus from the corpora. In the preferred embodiment, the corpus within the corpora for which the most phonetic information is known is selected as the first corpus. In an alternate embodiment, the first corpus selected from the corpora is the corpus in the native language of the user.

If the first corpus does not include a phonetic transcript then the third step 3 of the method is generating a phonetic transcript of the first corpus using a user-definable first pronunciation dictionary, where each word in the first corpus is associated with at least one sequence of at least one phone symbol. In the preferred embodiment, the phonetic transcript of the first corpus is generated by associating each word in the first corpus to at least one sequence of at least one phone symbol in the pronunciation dictionary which most closely matches the actual phones of the word.

The fourth step 4 of the method is selecting a second corpus from the corpora.

If the second corpus does not include a phonetic transcript then the fifth step 5 of the method is generating a phonetic transcript of the second corpus using a user-definable second pronunciation dictionary, where each word in the second corpus is associated with at least one sequence of at least one phone symbol. In the preferred embodiment, the phonetic transcript of the second corpus is generated by associating each word in the second corpus to at least one sequence of at least one phone symbol in the user-definable second pronunciation dictionary which most closely matches the actual phones of the word.

The sixth step 6 of the method is identifying at least one allophone for each phone in the second corpus.

The seventh step 7 of the method is identifying for each phone in the second corpus one of the at least one allophone identified in the sixth step 6 that most closely matches the phone in the second corpus using a user-definable acoustic model for each of the at least one allophone.

The eighth step 8 of the method is replacing each phone symbol in the phonetic transcript of the second corpus with a symbol for the corresponding allophone identified in the seventh step 7.

The ninth step 9 of the method is combining the first corpus and the second corpus, including the phonetic transcript of the first corpus and the phonetic transcript of the second corpus, and designating the result as the first corpus.

The tenth, and last, step 10 of the method is returning to the fourth step 4 if there is another corpus in the corpora to be processed. Otherwise stopping.

In an alternate embodiment, a user-definable number of phonetic symbols from the transcript of the second corpus are deleted.

What is claimed is:

1. A method of combining corpora to achieve consistency in phonetic labeling, comprising the steps of:
    (a) receiving corpora;
    (b) selecting a first corpus from the corpora;
    (c) if the first corpus does not include a phonetic transcript of the first corpus then generating the phonetic transcript of the first corpus using a user-definable first pronunciation dictionary, where each word in the first corpus is associated with at least one sequence of at least one phone symbol;
    (d) selecting a second corpus from the corpora;
    (e) if the second corpus does not include a phonetic transcript of the second corpus then generating a phonetic transcript for the second corpus using a user-definable second pronunciation dictionary, where each word in the second corpus is associated with at least one sequence of at least one phone symbol;
    (f) identifying at least one allophone for each phone in the second corpus;
    (g) identifying for each phone in the second corpus one of the at least one allophone identified in step (f) that most closely matches the phone in the second corpus using a user-definable acoustic model for each of the at least one allophone;
    (h) replacing each phone symbol in the phonetic transcript of the second corpus with a symbol for the corresponding allophone identified in step (g);
    (i) combining the first corpus and the second corpus, including the phonetic transcript of the first corpus and the phonetic transcript of the second corpus, and designating the result as the first corpus; and
    (j) returning to step (d) if there is another corpus in the corpora to be processed, otherwise stopping.

2. The method of claim 1, wherein the step of receiving corpora is comprised of receiving corpora that are not all in the same language.

3. The method of claim 2, wherein the step of selecting a first corpus from the corpora is comprised of the step of selecting a first corpus from the corpora for which most is known phonetically.

4. The method of claim 3, wherein the step of selecting a first corpus from the corpora is comprised of selecting a first corpus in a native language of a user of the method from the corpora.

5. The method of claim 4, wherein the step of generating the phonetic transcript of the first corpus is comprised of associating each word in the first corpus with at least one sequence of at least one phone symbol in the user-definable first pronunciation dictionary which most closely matches actual phones of the word.

6. The method of claim 5, wherein the step of generating the phonetic transcript of the second corpus is comprised of associating each word in the second corpus with at least one sequence of at least one phone symbol in the user-definable second pronunciation dictionary which most closely matches actual phones of the word.

7. The method of claim 6, further including the step of deleting a user-definable number of phonetic symbols from the transcript of the second corpus.

8. The method of claim 1, wherein the step of selecting a first corpus from the corpora is comprised of the step of selecting a first corpus from the corpora for which most in known phonetically.

9. The method of claim 1, wherein the step of selecting a first corpus from the corpora is comprised of selecting a first corpus in a native language of a user of the method from the corpora.

10. The method of claim 1, wherein the step of generating the phonetic transcript of the first corpus is comprised of associating each word in the first corpus with at least one sequence of at least one phone symbol in the user-definable first pronunciation dictionary which most closely matches actual phones of the word.

11. The method of claim 1, wherein the step of generating the phonetic transcript of the second corpus is comprised of associating each word in the second corpus with at least one sequence of at least one phone symbol in the user-definable second pronunciation dictionary which most closely matches actual phones of the word.

12. The method of claim 1, further including the step of deleting a user-definable number of phonetic symbols from the transcript of the second corpus.

* * * * *